(12) United States Patent
Sawada et al.

(10) Patent No.: US 9,027,680 B2
(45) Date of Patent: May 12, 2015

(54) HYBRID VEHICLE AND CONTROL METHOD THEREOF

(75) Inventors: Hiroki Sawada, Toyota (JP); Kazuyoshi Obayashi, Chita-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 524 days.

(21) Appl. No.: 12/866,073

(22) PCT Filed: Oct. 16, 2008

(86) PCT No.: PCT/JP2008/068791
§ 371 (c)(1),
(2), (4) Date: Aug. 4, 2010

(87) PCT Pub. No.: WO2009/101731
PCT Pub. Date: Aug. 20, 2009

(65) Prior Publication Data
US 2011/0004364 A1 Jan. 6, 2011

(30) Foreign Application Priority Data

Feb. 13, 2008 (JP) ................. 2008-031894

(51) Int. Cl.
*B60W 10/06* (2006.01)
*B60K 6/445* (2007.10)
(Continued)

(52) U.S. Cl.
CPC ............ *B60K 6/445* (2013.01); *B60L 11/1861* (2013.01); *B60W 10/06* (2013.01); *B60W 10/08* (2013.01); *B60W 10/26* (2013.01); *B60W 30/1882* (2013.01); *F02D 29/02* (2013.01); *F02D 29/06* (2013.01); *B60W 20/00* (2013.01); *B60W 2510/244* (2013.01); *B60W 2540/10* (2013.01); *B60W 2710/0644* (2013.01); *B60W 2710/0666* (2013.01); *Y02T 10/6239* (2013.01);
(Continued)

(58) Field of Classification Search
CPC .............................. B60W 10/06; B60W 10/08
USPC ................................. 701/22; 180/65.2, 65.28
See application file for complete search history.

(56) References Cited

U.S. PATENT DOCUMENTS

2007/0145924 A1* 6/2007 Obayashi ...................... 318/376
2007/0272456 A1* 11/2007 Shiiba .......................... 180/65.2
2008/0023238 A1* 1/2008 Shimizu et al. .............. 180/65.2

FOREIGN PATENT DOCUMENTS

JP A 9-098517 4/1997
JP A 10-023608 1/1998
(Continued)

OTHER PUBLICATIONS

International Search Report issued in corresponding International Application No. PCT/JP2008/068791, mailed Nov. 18, 2008. (with English-language translation).

*Primary Examiner* — Hunter Wilder
(74) *Attorney, Agent, or Firm* — Oliff PLC

(57) ABSTRACT

In a hybrid vehicle, a target rotational speed and a target torque or a target operation point of an engine are set to a predetermined optimal efficiency rotational speed and a predetermined optimal efficiency torque that enable the engine to be operated efficiently when the engine is operated while a state of charge of the battery is equal to or more than a control-center state of charge after a start of a driving of the vehicle. Then, the engine and motors are controlled so that the engine is operated at the target operation point and a torque equivalent to a torque demand is output to a ring gear shaft or an axle.

6 Claims, 8 Drawing Sheets

(51) Int. Cl.
  *B60L 11/18* (2006.01)
  *B60W 10/08* (2006.01)
  *B60W 10/26* (2006.01)
  *B60W 30/188* (2012.01)
  *F02D 29/02* (2006.01)
  *F02D 29/06* (2006.01)
  *B60W 20/00* (2006.01)

(52) U.S. Cl.
  CPC .......... *Y02T10/6269* (2013.01); *Y02T 10/6286* (2013.01); *Y02T 10/646* (2013.01); *Y02T 10/7005* (2013.01); *Y02T 10/7044* (2013.01); *Y02T 10/705* (2013.01); *Y02T 10/648* (2013.01)

(56) References Cited

FOREIGN PATENT DOCUMENTS

| | | |
|---|---|---|
| JP | A 2003-343304 | 12/2003 |
| JP | A 2006-077600 | 3/2006 |
| JP | A 2007-062640 | 3/2007 |
| JP | A 2007-216791 | 8/2007 |
| JP | A 2007-269249 | 10/2007 |
| WO | WO 2006109379 A1 * | 10/2006 |

* cited by examiner

HYBRID VEHICLE AND CONTROL METHOD THEREOF

TECHNICAL FIELD

The present invention relates to a hybrid vehicle and a control method thereof.

BACKGROUND ART

Conventionally, there is known a hybrid vehicle that includes an engine and a motor as power sources, an engine control module that controls an operation and a stop of the engine, and an accelerator pedal to increase or decrease a propulsion force of the vehicle (for example, refer to Patent Document 1). In the vehicle, the engine is started when an output change of the accelerator pedal becomes equal to or larger than a predetermined value within a predetermined period while the motor is only used as the power source, and an output of the motor is decreased in accordance with an increase of an output of the engine after the start of the engine. Further, there is known a power output apparatus for a hybrid vehicle that sets a target rotational speed and a target torque of an engine through the use of an operation curve for a battery limitation state when a state of the battery is not in a state of an allowable input and output range and controls the engine and two motors based on the set target rotational speed and the set target torque (for example, refer to Patent Document 2). In the operation curve for the battery limitation state, high rotation speeds are preset in a low power side in comparison with a normal operation curve so that a rotational speed change with respect to a power change becomes small in comparison with the normal operation curve. Furthermore, there is known a control apparatus of a hybrid vehicle electronically controls operation states of an engine and a motor as power sources for driving the vehicle in accordance with an operation amount of an accelerator by a driver (for example, refer to Patent Document 3). The control apparatus controls the motor to implement a torque assist so as to make a torque increase of the motor higher priority than an output change of the engine. Further, there is known a hybrid electric vehicle that drives a motor by electric power from a battery that is previously charged by a charge source and the like prior to a start of a driving so that a state of charge becomes 100% (for example, refer to Patent Document 4). In the hybrid electric vehicle, when the state of charge becomes 50% after the start of the driving, a prime mover is driven to start a power generation by a generator, so that electric power is supplied to the motor of the vehicle and is used to charge the battery. An operation of the prime mover and the power generation by the generator are stopped when the state of charge becomes 55%. Then, the motor is driven by only electric power from the battery.

[Patent Document 1] Japanese Patent Laid-Open No. 2003-343304
[Patent Document 2] Japanese Patent Laid-Open No. 2006-077600
[Patent Document 3] Japanese Patent Laid-Open No. Hei 10-23608
[Patent Document 4] "Background Art" of Japanese Patent Laid-Open No. Hei 09-98517

DISCLOSURE OF THE INVENTION

The battery disclosed in Patent Document 4 and capable of being charged by electric power (commercial power) from the charge source outside of the vehicle may be applied to a hybrid vehicle including an engine and a motor as power sources for driving the vehicle. Thus, the hybrid vehicle may be driven like a pure electric vehicle. In such a hybrid vehicle, the battery is previously charged by the charge source prior to the start of the driving. Accordingly, in light of an efficiency of the vehicle, it is preferable to consume electric power of the battery previously charged as much as possible up to an end the driving. In order to improve the efficiency of the vehicle, the engine should be appropriately operated so as to effectively consume electric power of the battery.

The present invention has an object to appropriately operate an internal combustion engine capable of outputting power for driving a hybrid vehicle with an accumulator that is capable of being charged with electric power from a charge source outside of the vehicle so as to improve an efficiency of the vehicle.

The present invention accomplishes the demand mentioned above by the following configurations applied to a hybrid vehicle and a control method thereof.

The hybrid vehicle according to the present invention is a hybrid vehicle that includes an internal combustion engine and a motor that are respectively capable of outputting power for driving the vehicle. The hybrid vehicle includes an accumulator that is capable of supplying and receiving electric power from the motor and is configured to be capable of being charged with electric power from a charge source outside of the vehicle, a driving force demand setting module configured to set a driving force demand required for driving the vehicle, an engine operation point setting module that sets a target operation point of the internal combustion engine to a predetermined operation point that enables the internal combustion engine to be operated efficiently when the internal combustion engine is to be operated while a residual capacity of the accumulator is equal to or more than a predetermined reference residual capacity after a start of a driving of the vehicle and sets the target operation point of the internal combustion engine based on the set driving force demand when the internal combustion engine is to be operated after the residual capacity of the accumulator once becomes less than the reference residual capacity after the start of the driving of the vehicle, and a control module configured to control the internal combustion engine and the motor so that the internal combustion engine is operated at the set target operation point and a driving power equivalent to the set driving force demand is ensured.

The hybrid vehicle includes the accumulator that is capable of supplying and receiving electric power from the motor. The accumulator is configured to be capable of being charged with electric power from the charge source outside of the vehicle. In the hybrid vehicle, the target operation point of the internal combustion engine is set to the predetermined operation point that enables the internal combustion engine to be operated efficiently when the internal combustion engine is to be operated while the residual capacity of the accumulator is equal to or more than the predetermined reference residual capacity after the start of the driving of the vehicle. Then, the internal combustion engine and the motor are controlled so that the internal combustion engine is operated at the set target operation point and the driving power equivalent to the set driving force demand is ensured. When the internal combustion engine is to be operated after the residual capacity of the accumulator once becomes less than the reference residual capacity after the start of the driving of the vehicle, the target operation point of the internal combustion engine is set based on the set driving force demand. Then, the internal combustion engine and the motor are controlled so that the internal combustion engine is operated at the set target operation point and the driving power equivalent to the set driving force demand is ensured. Thus, the internal combustion engine is efficiently operated at the above predetermined operation point so as to output constant power or power within a predetermined range when the internal combustion engine is to be operated while the residual capacity of the accumulator is equal to or more than the predetermined reference residual capacity after the start of the driving. During that time, the more the driving force demand increases, the ratio of power from the motor to the power for driving the vehicle increases. Accordingly, the hybrid vehicle improves a fuel efficiency of the internal combustion engine and accelerates consumption of the electric power in the accumulator by the motor while the residual capacity of the accumulator is equal to or more than the predetermined reference residual capacity after the start of the driving. Further, the target operation point of the internal combustion engine is set based on the driving force demand after the residual capacity of the accumulator once becomes less than the reference residual capacity after the start of the driving. Thus, the driving power based on the driving force demand can be preferably ensured while supplying the electric power to the motor from the accumulator within a restricted residual capacity range to some extent, thereby facilitating to decrease the residual capacity of the accumulator as much as possible upon a completion of the driving. Accordingly, in the hybrid vehicle of the present invention including the accumulator capable of being charged with electric power from the charge source outside of the vehicle, the internal combustion engine capable of outputting power for driving the vehicle can be appropriately operated so as to improve the efficiency of the vehicle.

The predetermined operation point may be an operation point in which an efficiency of the internal combustion engine becomes practically optimal. Thus, the internal combustion engine can be efficiently operated so as to improve the fuel efficiency of the internal combustion engine while the residual capacity of the accumulator is equal to or more than the predetermined reference residual capacity after the start of the driving.

The hybrid vehicle may further includes a generator that is capable of generating electric power through the use of at least part of power from the internal combustion engine and supplying and receiving electric power from the accumulator, and a target charge-discharge electric power setting module that sets a target charge-discharge electric power to charge or discharge the accumulator so as to keep the residual capacity of the accumulator within a predetermined range including the reference residual capacity. The engine operation point setting module may set a target rotational speed and a target torque that define the target operation point of the internal combustion engine through the use of a power demand based on the set driving force demand and the set target charge-discharge electric power and an engine operation point setting constraint after the residual capacity of the accumulator once becomes less than the reference residual capacity after the start of the driving of the vehicle. The engine operation point setting constraint may define rotational speeds and torques that correspond to the power demands and may enable the internal combustion engine to be operated efficiently. The control module may control the internal combustion engine, the generator and the motor so that the internal combustion engine is operated at the set target operation point, the accumulator is charged or discharged by the set target charge-discharge electric power, and the driving power equivalent to the set driving force demand is ensured. The predetermined operation point may be defined by a rotational speed and a torque that make an efficiency of the internal combustion engine optimal among the rotational speeds and the torques defined in the engine operation point setting constraint. Thus, after the residual capacity of the accumulator once becomes less than the reference residual capacity after the start of the driving, the internal combustion engine can be relatively efficiently operated so as to improve the fuel efficiency of the internal combustion engine and the residual capacity of the accumulator can be ensured within a range that facilitates to decrease the residual capacity of the accumulator as much as possible upon the completion of the driving.

A stop of an operation of the internal combustion engine may be prohibited when a power demand based on at least the set driving force demand becomes equal to or more than a predetermined threshold while the operation of the internal combustion engine is stopped. The predetermined threshold may be smaller than a power output by the internal combustion engine operated at the predetermined operation point. Thus, the operation point of the internal combustion engine can be smoothly and quickly shifted to the above predetermined operation point after the power demand based on the driving force demand becomes equal to or more than the predetermined threshold while the operation of the internal combustion engine is stopped and the internal combustion engine is started to operate.

The hybrid vehicle may further includes an electric power-mechanical power input output structure connected to a predetermined axle and an engine shaft of the internal combustion engine and outputting at least a part of power from the internal combustion engine to the axle side with input/output of electric power and mechanical power. The electric power-mechanical power input output structure may supply and receive electric power from the accumulator. In this case, the electric power-mechanical power input output structure may include a power generation motor capable of inputting and outputting power and supplying and receiving electric power from the accumulator, and a three shaft-type power input output assembly connected with three shafts, the predetermined axle, the engine shaft of the internal combustion engine, and a rotating shaft of the power generation motor. The three shaft-type power input output assembly may be configured to input and output power to one remaining shaft, based on input and output of powers from and to any two shafts selected among the three shafts. The motor may be capable of inputting and outputting power to the predetermined axle or another axle different from the predetermined axle.

The control method of a hybrid vehicle according to the present invention is a control method of a hybrid vehicle that includes an internal combustion engine that is capable of outputting power for driving the vehicle, a motor that is capable of outputting power for driving the vehicle, and an accumulator that is capable of supplying and receiving electric power from the motor and configured to be capable of being charged with electric power from a charge source outside of the vehicle. The method includes the steps of (a) setting a target operation point of the internal combustion engine to a predetermined operation point that enables the internal combustion engine to be operated efficiently when the internal combustion engine is to be operated while a residual capacity of the accumulator is equal to or more than a predetermined reference residual capacity after a start of a driving of the vehicle, and setting the target operation point of the internal combustion engine based on a driving force demand required for driving the vehicle when the internal combustion engine is to be operated after the residual capacity of the accumulator once becomes less than the reference residual capacity after the start of the driving of the vehicle, and (b) controlling the internal combustion engine and the motor so that the internal combustion engine is operated at the target operation point set at Step (a) and a driving power equivalent to the driving force demand is ensured.

According to the method, the internal combustion engine is efficiently operated so as to output constant power or power within a predetermined range when the internal combustion engine is to be operated while the residual capacity of the accumulator is equal to or more than the predetermined reference residual capacity after the start of the driving. During that time, the more the driving force demand increases, the ratio of power from the motor to the power for driving the vehicle increases. Accordingly, the method improves a fuel efficiency of the internal combustion engine and accelerates consumption of the electric power in the accumulator by the motor while the residual capacity of the accumulator is equal to or more than the predetermined reference residual capacity after the start of the driving. Further, the target operation point of the internal combustion engine is set based on the driving force demand after the residual capacity of the accumulator once becomes less than the reference residual capacity after the start of the driving. Thus, the driving power based on the driving force demand can be Preferably ensured while supplying the electric power to the motor from the accumulator within a restricted residual capacity range to some extent, thereby facilitating to decrease the residual capacity of the accumulator as much as possible upon a completion of the driving. According to the method, it is possible to appropriately operate the internal combustion engine capable of outputting power for driving the hybrid vehicle with an accumulator that is capable of being charged with electric power from a charge source outside of the vehicle so as to improve the efficiency of the vehicle.

The predetermined operation point may be an operation point in which an efficiency of the internal combustion engine becomes practically optimal.

The method may include the step of (c) setting a target charge-discharge electric power to charge or discharge the accumulator so as to keep the residual capacity of the accumulator within a predetermined range including the reference residual capacity. The hybrid vehicle may include a generator that is capable of generating electric power through the use of at least part of power from the internal combustion engine and supplying and receiving electric power from the accumulator. Step (a) may set a target rotational speed and a target torque that define the target operation point of the internal combustion engine through the use of a power demand based on the driving force demand and the target charge-discharge electric power set at Step (c) and an engine operation point setting constraint after the residual capacity of the accumulator once becomes less than the reference residual capacity after the start of the driving of the vehicle. The engine operation point setting constraint may define rotational speeds and torques that correspond to the power demands and enable the internal combustion engine to be operated efficiently. Step (b) may control the internal combustion engine, the generator and the motor so that the internal combustion engine is operated at the target operation point set at Step (a), the accumulator is charged or discharged by the set target charge-discharge electric power, and the driving power equivalent to the set driving force demand is ensured. The predetermined operation point may be defined by a rotational speed and a torque that make an efficiency of the internal combustion engine optimal among the rotational speeds and the torques defined in the engine operation point setting constraint.

A stop of an operation of the internal combustion engine may be prohibited when a power demand based on at least the set driving force demand becomes equal to or more than a predetermined threshold while the operation of the internal combustion engine is stopped. The predetermined threshold may be smaller than a power output by the internal combustion engine operated at the predetermined operation point.

BEST MODES OF CARRYING OUT THE INVENTION

Now, the best mode for carrying out the present invention will be described with reference to an embodiment.

Figure 1:
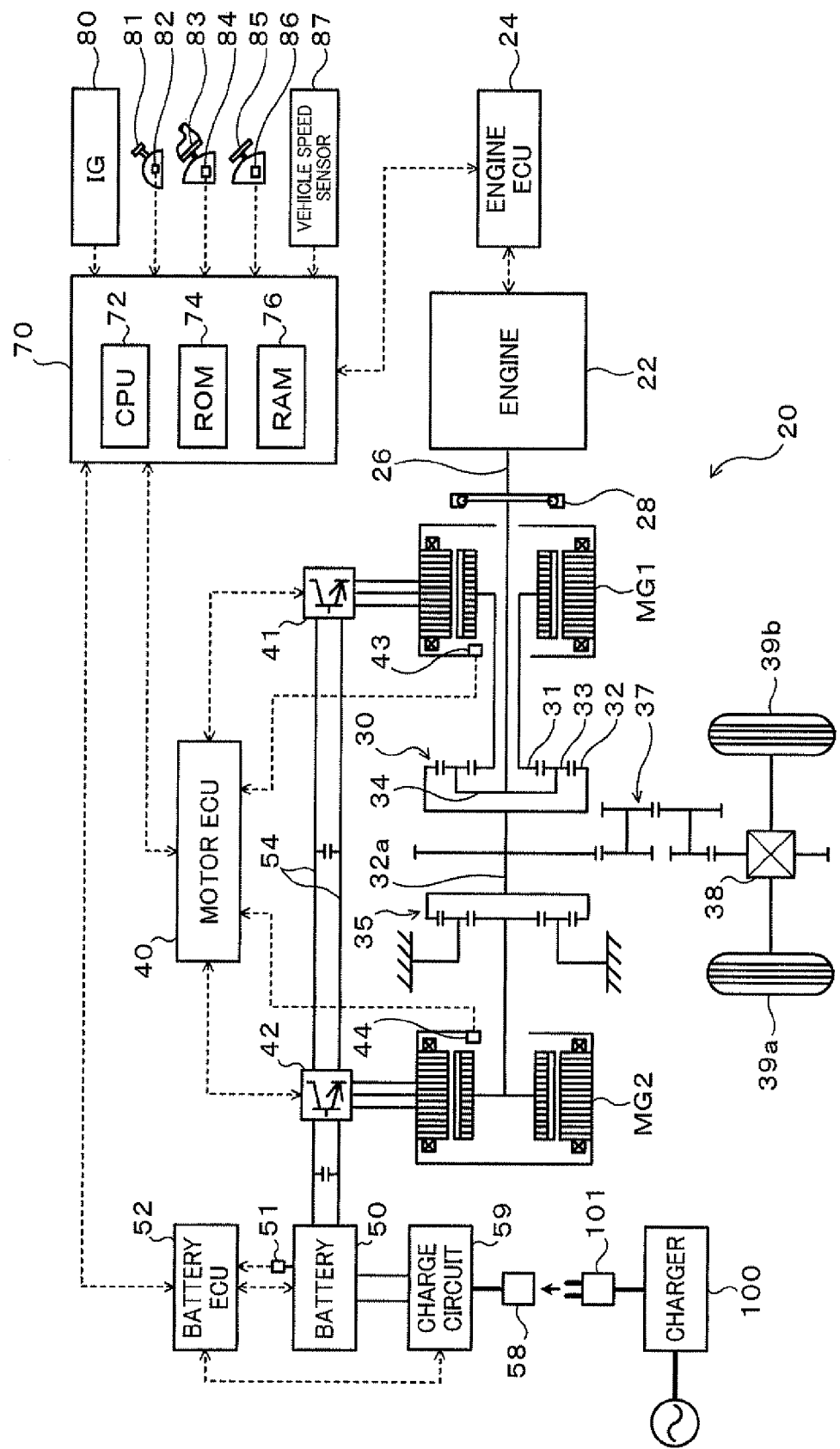
FIG. 1 is a schematic block diagram of a hybrid vehicle 20 according to an embodiment of the present invention.

FIG. 1 schematically illustrates the configuration of a hybrid vehicle 20 in an embodiment of the invention. The hybrid vehicle 20 of the illustrated configuration includes an engine 22, a three shaft-type power distribution integration mechanism 30 connected via a damper 28 to a crankshaft (engine shaft) 26 of the engine 22, a motor MG1 connected to the power distribution integration mechanism 30 and designed to have power generation capability, a reduction gear 35 connected to a ring gear shaft 32a or an axle connected to the power distribution integration mechanism 30, a motor MG2 connected to the ring gear shaft 32a via the reduction gear 35, and a hybrid electronic control unit 70 (hereinafter referred to as "hybrid ECU") configured to control the operations of the whole hybrid vehicle 20.

The engine 22 is constructed as an internal combustion engine designed to consume a hydrocarbon fuel, such as gasoline or light oil, and thereby generating power. The engine 22 is under operation controls, such as fuel injection control, ignition timing control, and intake air flow control, of an engine electronic control unit 24 (hereinafter referred to as "engine ECU") The engine ECU 24 inputs diverse signals from various sensors mounted on the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 or an external gear, a ring gear 32 or an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 or the rotational elements of differential motions. The carrier 34 or an engine-side rotational element, the sun gear 31, and the ring gear 32 or an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 receive and supply electric power to a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is constructed as a nickel hydrogen secondary battery or a lithium ion secondary battery and is under control and management of a battery electronic control unit 52 (hereinafter referred to as "battery ECU"). In the hybrid vehicle 20 of the embodiment, the battery 50 is constructed to be capable of being charged by electric power from a charger 100 outside of the vehicle. The charger 100 is electrically connected to a commercial power (AC 100V) for example. Accordingly, a charge circuit 59 is connected to the battery 50. The charge circuit 59 includes a connector 58 connectable with a connector 101 of the charger 100, a transformer, AC/DC converter (not shown) and the like, and is controlled by the battery ECU 52. Thus, a driving of the hybrid vehicle 20 can be started in an adequately charged state of the battery 50 by charging the battery 50 through the use of the charger 100 prior to a start of a driving of the hybrid vehicle 20. The battery ECU 52 inputs various signals required for management and control of the battery 50, for example, a battery temperature Tb from a temperature sensor 51 attached to the battery 50, an inter-terminal voltage from a voltage sensor (not shown) disposed between terminals of the battery 50, and a charge-discharge current from a current sensor (not shown) disposed in the power line 54 connecting with the output terminal of the battery 50. The battery ECU 52 outputs data regarding the operating conditions of the battery 50 by data communication to the hybrid ECU 70 and the engine ECU 24 according to the requirements. The battery ECU 52 also performs various arithmetic operations for management and control of the battery 50. A residual capacity or state of charge SOC of the battery 50 is calculated from an integrated value of the charge-discharge current. A charge-discharge power demand (target charge-discharge electric power) Pb* is set based on the calculated state of charge SOC of the battery 50. An input limit Win or an allowable charging electric power to be charged in the battery 50 and an output limit Wout or an allowable discharging electric power to be discharged from the battery 50 are set in accordance with the calculated state of charge SOC and the battery temperature Tb.

Figure 2:
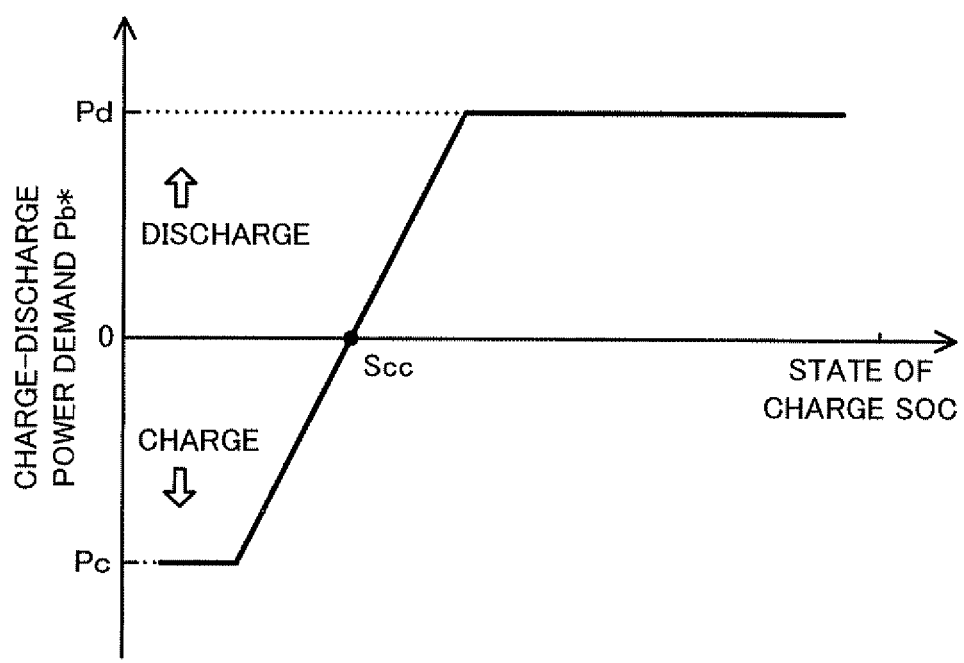
FIG. 2 is a view illustrating an example of a charge-discharge power demand setting map.

In the embodiment, the charge-discharge power demand Pb* is set based on the state of charge SOC and a charge-discharge power demand setting map exemplified in FIG. 2. By using the charge-discharge power demand setting map of FIG. 2, the charge-discharge power demand Pb* is set to a predetermined discharge electric power (positive value) Pd when the state of charge SOC of the battery 50 is equal to or more than a control-center state of charge (reference state of charge) See (for example, 35% in the embodiment) and is equal to or less than a predetermined value that is slightly smaller than a full charge (100%). When the state of charge SOC of the battery 50 is less than the control-center state of charge Scc and is equal to or more than a predetermined value that is slightly larger than a full discharge (0%), the charge-discharge power demand Pb* is set to a predetermined charge electric power (negative value) Pc so as to keep the state of charge SOC within a range including the control-center state of charge Sec. The input and output limits Win and Wout of the battery 50 may be set by setting a basic value depending on the battery temperature Tb and setting an input limit correction coefficient and an output limit correction coefficient based on the state of charge SOC of the battery 50, and then multiplying the set basic value of the input and output limits Win and Wout by the set correction coefficient.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. As described above, the hybrid ECU 70 is connected via the communication port with the engine ECU 24, the motor ECU 40, the battery ECU 52, and the like, and exchanges various control signals and data with the engine ECU 24, the motor ECU 40, the battery ECU 52, and the like.

The hybrid vehicle 20 of the embodiment constructed as described above sets a torque demand, which is to be output to the ring gear shaft 32a or the driveshaft linked with an axle of the hybrid vehicle 20, based on the vehicle speed V and the accelerator opening Acc corresponding to the driver's depression amount of the accelerator pedal 83, and controls the operations of the engine 22, the motors MG1 and MG2 to ensure output of power equivalent to the set torque demand to the ring gear shaft 32a. There are several drive control modes of the engine 22, the motors MG1 and MG2. In a torque conversion drive mode, while the engine 22 is driven and controlled to ensure output of the power equivalent to the torque demand, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the power demand to the ring gear shaft 32a, while the engine 22 stops its operation. In the hybrid vehicle 20 of the embodiment, an intermittent operation of the engine 22 to automatically stop or start the engine 22 is executed when predetermined conditions are satisfied in the torque conversion drive mode and the charge-discharge drive mode.

Figure 3:
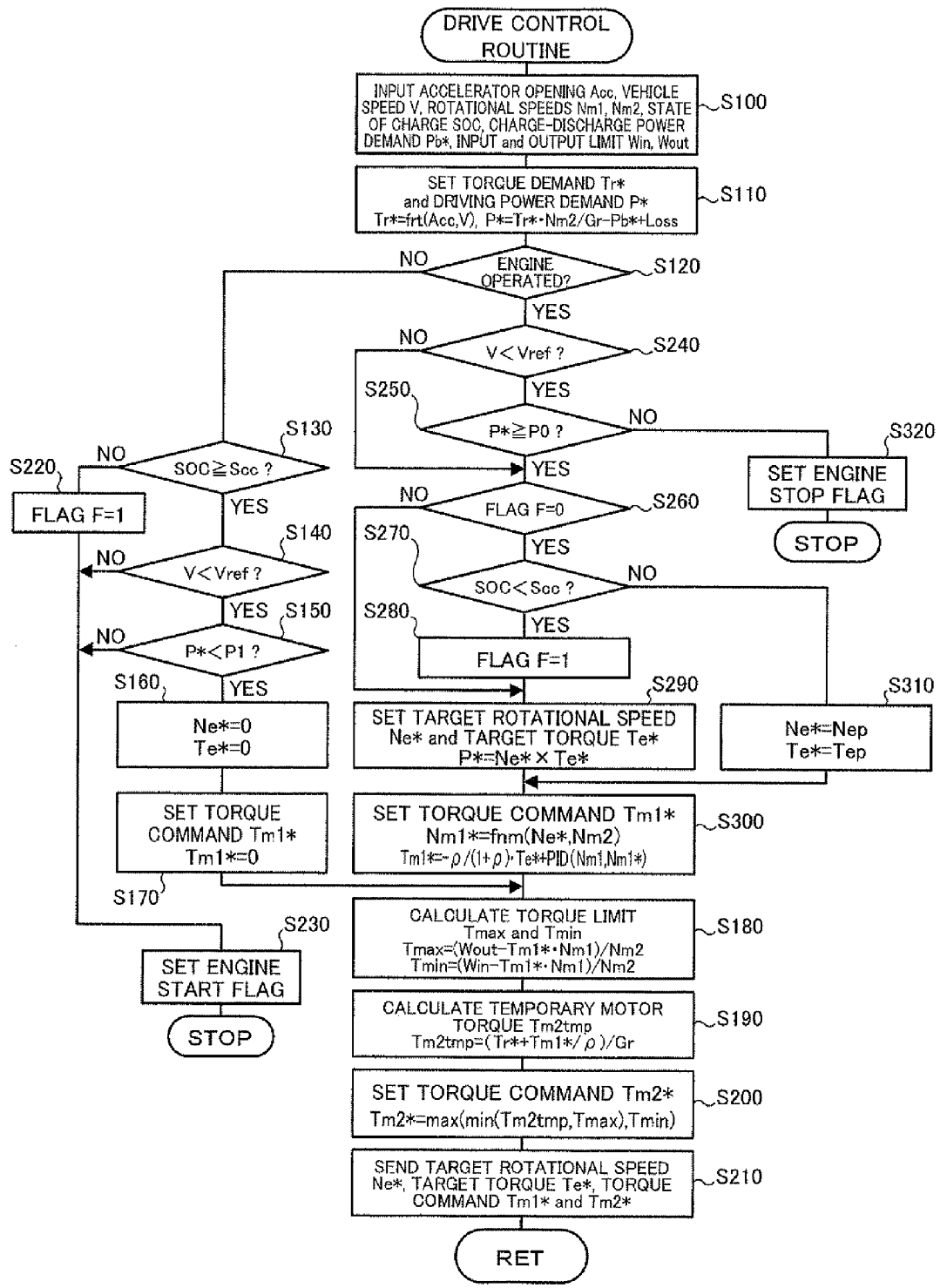
FIG. 3 is a flowchart illustrating an example of a drive control routine executed by a hybrid electric control unit 70 in the embodiment.

Next, the operation of the hybrid vehicle 20 with the above configuration will be described. FIG. 3 is a flowchart illustrating an example of a drive control routine that is executed by the hybrid ECU 70 at predetermined time intervals (for example, at ever several msec) after the start of the driving of the hybrid vehicle 20.

Figure 4:
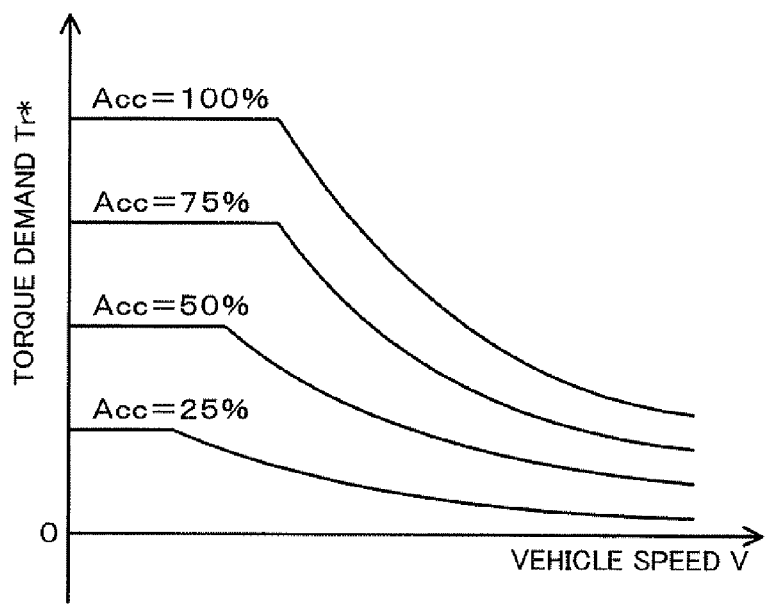
FIG. 4 is a view illustrating an example of a torque demand setting map.

At a start of the drive control routine in FIG. 3, the CPU 72 of the hybrid ECU 70 executes input processing of data required for control such as the accelerator opening Acc from the accelerator pedal position sensor 84, the vehicle speed V from the vehicle speed sensor 87, the rotational speeds Nm1, Nm2 of the motors MG1, MG2, the state of charge SOC, the charge-discharge power demand Pb*, the input limit Win and the output limit Wout of the battery 50 (Step S100). The rotational speeds Nm1 and Nm2 of the motors MG1 and MG2 are input from the motor ECU 40 by communication. The state of charge SOC, the charge-discharge power demand Pb*, the input limit Win and the output limit Wout of the battery 50 are input from the battery ECU 52 by communication. After the data input at Step S100, the CPU 72 sets a torque demand Tr* to be output to the ring gear shaft 32a or the axle connected to drive wheels 39a and 39b based on the accelerator opening Acc and the input vehicle speed V, and sets a power demand P* required for whole of the vehicle (Step S110). In the embodiment, the torque demand Tr* corresponding to the given accelerator opening Acc and the given vehicle speed V is derived from a torque demand setting map previously stored in the ROM 74 and defining a relationship between the accelerator opening Acc, the vehicle speed V and the torque demand Tr*. FIG. 4 illustrates an example of the torque demand setting map. In the embodiment, the power demand P* is calculated as the sum of a product of the set torque demand Tr* and a rotational speed Nr of the ring gear shaft 32a, the charge-discharge power demand Pb*, and a potential loss. The rotational speed Nr of the ring gear shaft 32a is obtained by dividing the rotational speed Nm2 of the motor MG2 by a gear ratio Gr of the reduction gear 35 or by multiplying the vehicle speed V by a predetermined conversion factor k.

Then, the CPU 72 determines whether or not the engine 22 is operated (Step S120). When the operation of the engine 22 is stopped, the CPU 72 determines whether or not the state of charge SOC input at Step S100 is equal to or more than the above control-center state of charge Scc (Step S130). When the state of charge SOC is equal to or more than the above control-center state of charge Scc, the CPU 72 determines whether or not the vehicle speed V is less than a predetermined intermittent prohibition vehicle speed Vref (Step S140). The intermittent prohibition vehicle speed Vref is set to a lower limit value of a vehicle speed region in which the intermittent operation of the engine 22 is prohibited due to a requirement of the operation of the engine 22, for example. The intermittent prohibition vehicle speed Vref may be set so as to change in accordance with the state of the battery 50, a state of the engine 22, and/or a driving state of the hybrid vehicle 20. When the vehicle speed V is less than the intermittent prohibition vehicle speed Vref, the CPU 72 determines whether or not the power demand P* set at Step S110 is less than a predetermined engine start determination threshold P1 (Step S150). When determined that the power demand P* is less than the engine start determination threshold P1 at Step S150, the CPU 72 sets a target rotational speed Ne* and a target torque Te* of the engine 22 to value "0" (Step S160) and sets a torque command Tm1* of the motor MG1 to value "0" (Step S170) so as to continue the stop of the operation of the engine 22.

After that, the CPU 72 calculates a lower torque limit Tmin and an upper torque limit Tmax or allowable minimum and maximum torques to be output from the motor MG2 based on the input and output limits Win and Wout of the battery 50, the torque command Tm1*, the current rotational speed Nm1 and Nm2 of the motors MG1 and MG2 in accordance with Equations (1) and (2) given below (Step S180). Further, the CPU 72 calculates a temporary motor torque Tm2tmp or a torque value to be output from the motor MG2 based on the torque demand Tr*, the torque command Tm1*, a gear ratio ρ of the power distribution and integration mechanism 30, and the gear ratio Gr of the reduction gear 35 in accordance with an Equation (3) given below (Step S190). Then, the CPU 72 sets a torque command Tm2* of the motor MG2 to a value obtained by restricting the calculated temporary motor torque Tm2tmp by the lower and the upper torque limits Tmin and Tmax (Step S200). Setting the torque command Tm2* of the motor MG2 in this manner restricts the torque to be output to the ring gear shaft 32a or the axle in the range of the input limit Win of the battery 50 and the output limit Wout. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and the torque commands Tm1* and Tm2* of the motors MG1 and MG2 to the motor ECU 40 (Step S210) and returns to Step S100 to repeat the processing of and after Step S100. The motor ECU 40 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*.

$$T\text{min}=(W\text{in}-Tm1^* \cdot Nm1)/Nm2 \quad (1)$$

$$T\text{max}=(W\text{out}-Tm1^* \cdot Nm1)/Nm2 \quad (2)$$

$$Tm2\text{tmp}=(Tr^*+Tm1^*/\rho)/Gr \quad (3)$$

When determined that the state of charge SOC is less than the control-center state of charge Scc at Step S130, the engine 22 should be started to charge the battery 50 with electric power generated by at least the motor MG1. Thus, the CPU 72 sets a predetermined flag F to value "1" (Step S220). The flag F is set to value "0" until the state of charge SOC becomes less than the control-center state of charge Scc after the start of the driving. Then, the CPU 72 sets an engine start flag (Step S230) so as to start the operation of the engine 22 and terminates the routine. That is, the CPU 72 does not execute processes of Steps S140 and S150 (regardless of determination result) and sets engine start flag when determined that the state of charge SOC is equal to or less than the control-center state of charge Scc. Similarly, the CPU 72 sets the engine start flag so as to start the operation of the engine 22 and terminates the routine when determined that the state of charge SOC is equal to or more than the control-center state of charge Scc at Step S130 and determined that the vehicle speed V is equal to or more than the intermittent prohibition vehicle speed Vref at Step S140, or when determined that the power demand P* is equal to or more than the engine start determination threshold P1 at Step S150. When the engine start flag is set and the drive control routine of FIG. 3 is terminated, the hybrid ECU 70 executes an engine start drive control routine (not shown). That is, the engine 22 is started when the engine start condition in Steps S140 or S150 is satisfied after the CPU 72 determines that the state of charge SOC is equal to or more than the control-center state of charge Scc while the engine is stopped. The engine start drive control routine starts the engine 22 through a cranking by the motor MG1 and controls the motor MG2 so as to cancel a reaction torque that acts on the ring gear shaft 32a while cranking the engine 22 and ensure a torque equivalent to the torque command Tr* on the ring gear shaft 32a. When the engine start drive control routine is terminated, the engine start flag is rest and the hybrid ECU 70 executes the drive control routine of FIG. 3.

On the other hand, when determined that the engine 22 is not operated at Step S120, the CPU 72 determines whether or not the vehicle speed V input at Step S100 is less than the intermittent prohibition vehicle speed Vref (Step S240). When the vehicle speed V is less than the intermittent prohibition vehicle speed Vref, the CPU 72 determines whether or not the power demand P* set at Step S110 is equal to or more than a predetermined engine stop determination threshold P0 (Step S250). When determined than the vehicle speed V is equal to or more than the intermittent prohibition vehicle speed Vref at Step S240, or when determined that the power demand P* is equal to or more than the engine stop determination threshold P0 at Step S250, the CPU 72 determines whether or not the above flag F is value "0" (Step S260).

Figure 5:
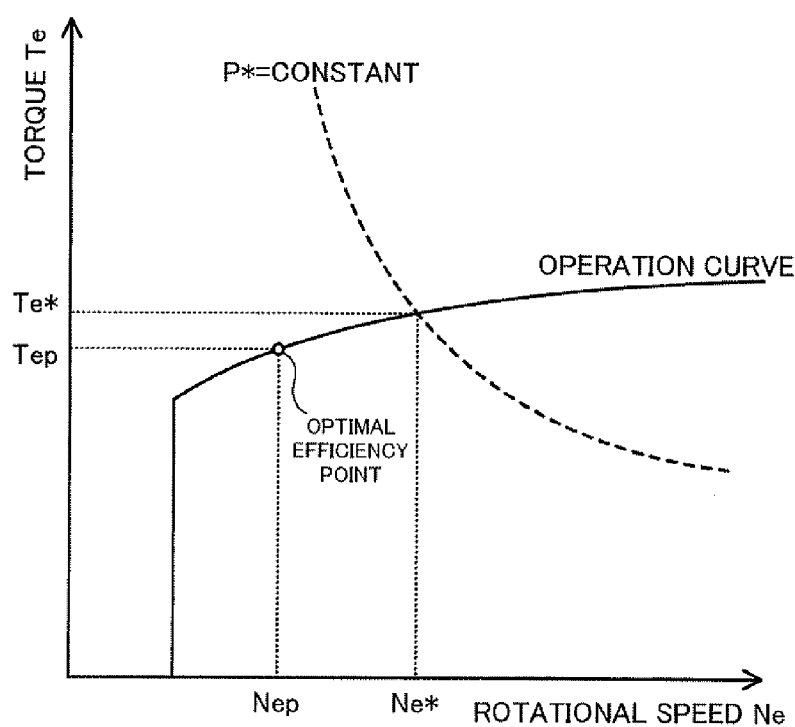
FIG. 5 is a view illustrating an operation curve of an engine 22 and a correlation curve between a target rotational speed Ne* and a target torque Te*.

When the flag F is value "0", the CPU 72 determines whether or not the state of charge SOC input at Step S100 is less than the control-center state of charge Scc of the battery 50 (Step S270). When determined that the flag F is value "1" at Step S260, the CPU 72 sets the target rotational speed Ne* and the target torque Te* or a target operation point of the engine 22 based on the power demand P* so as to output the power demand P* from the engine 22 (Step S290). Further, when determined that the flag F is value "0" at Step S260 and determined that the state of charge SOC is less than the control-center state of charge Scc at Step S270, the CPU 72 sets the flag F to value "1" (Step S280) and sets the target rotational speed Ne* and the target torque Te* or the target operation point of the engine 22 based on the power demand P* (Step S290). In the embodiment, the target rotational speed Ne* and the target torque Te* of the engine 22 are set based on the power demand P* and a predetermined operation curve for operating the engine 22 with high efficiency. The operation curve is previously stored in the ROM 74. FIG. 5 illustrates the operation curve of the engine 22 and a correlation curve between the target rotational speed Ne* and the target torque Te*. As shown in FIG. 5, the target rotational speed Ne* and the target torque Te* can be obtained from an intersection between the operation curve and the correlation curve indicating a constant power demand P* (Ne*×Te*).

Figure 6:
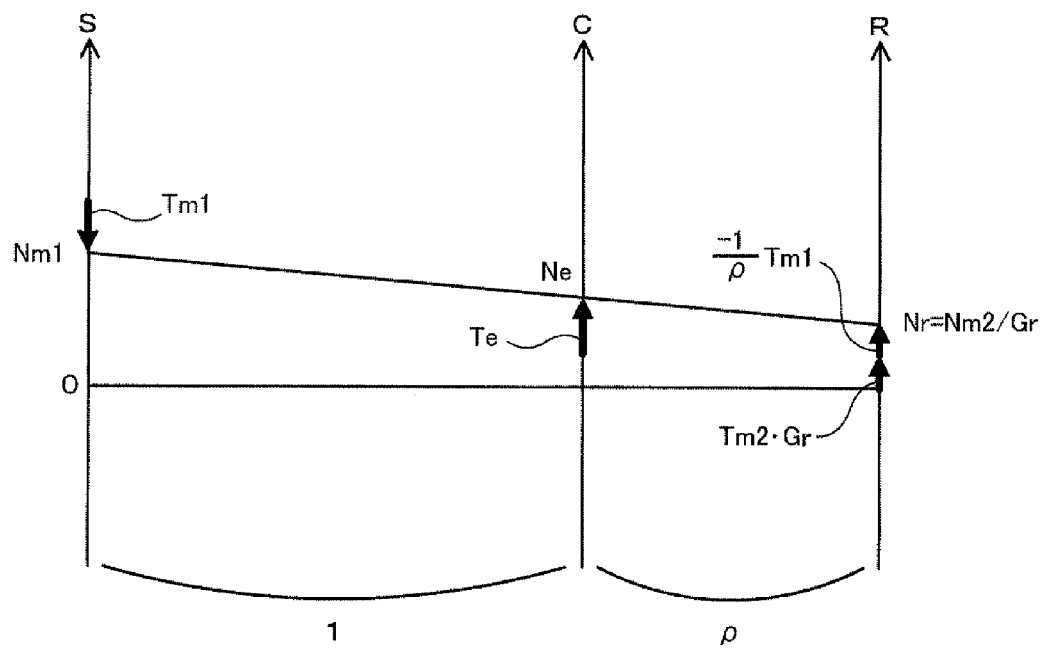
FIG. 6 is a view illustrating an alignment chart showing a dynamic relationship between a rotational speed and torque of each rotating element of a power distribution and integration mechanism 30.

Then, the CPU 72 calculates a target rotational speed Nm1* of the motor MG1 from the set target rotational speed Ne*, the rotational speed Nr (=Nm2/Gr) of the ring gear shaft 32a, and the gear ratio ρ of the power distribution integration mechanism 30 (a quotient of the number of teeth of the sun gear 31 by the number of teeth of the ring gear 32) according to Equation (4) given below. Further, the CPU 72 computes a torque command Tm1* of the motor MG1 by calculation of below Equation (5) based on the calculated target rotational speed Nm1* and a current rotational speed Nm1 of the motor MG1 (Step S300). Equation (4) is a dynamic relational expression of respective rotational elements included in the power distribution integration mechanism 30. FIG. 6 illustrates an alignment chart showing torque-rotational speed dynamics of the respective rotational elements included in the power distribution integration mechanism 30. In FIG. 6, the left axis 'S' represents a rotational speed of the sun gear 31 that is equivalent to the rotational speed Nm1 of the motor MG1, the middle axis 'C' represents a rotational speed of the carrier 34 that is equivalent to the rotational speed Ne of the engine 22, and the right axis 'R' represents the rotational speed Nr of the ring gear 32 obtained by dividing the rotational speed Nm2 of the motor MG2 by the gear ratio Gr of the reduction gear 35. Two thick arrows on the axis 'R' respectively show torque applied to the ring gear shaft 32a by output of the torque Tm1 from the motor MG1, and torque applied to the ring gear shaft 32a via the reduction gear 35 by output of the torque Tm2 from the motor MG2. Equation (4) for computation of the target rotational speed Nm1* of the motor MG1 is readily obtained by taking into account the rotational speed relation in the alignment chart. Equation (5) is a relational expression of feedback control to drive and rotate the motor MG1 at the target rotational speed Nm1*. In Equation (5) given above, 'k1' in the second term and 'k2' in the third term on the right side respectively denote a gain of the proportional and a gain of the integral term. After setting the torque command Tm1* of the motor MG1, the CPU 72 executes above processes of Steps S180-S210 and repeats processes after Step S100. Equation (3) used at Step S190 is readily obtained from the alignment chart shown in FIG. 6.

$$Nm1^* = Ne^* \cdot (1+\rho)/\rho - Nm2/(Gr \cdot \rho) \qquad (4)$$

$$Tm1^* \cdot -\rho/(1+\rho) \cdot Te^* + k1 \cdot (Nm1^* - Nm1) + k2 \cdot \int (Nm1^* - Nm1) dt \qquad (5)$$

Figure 7:
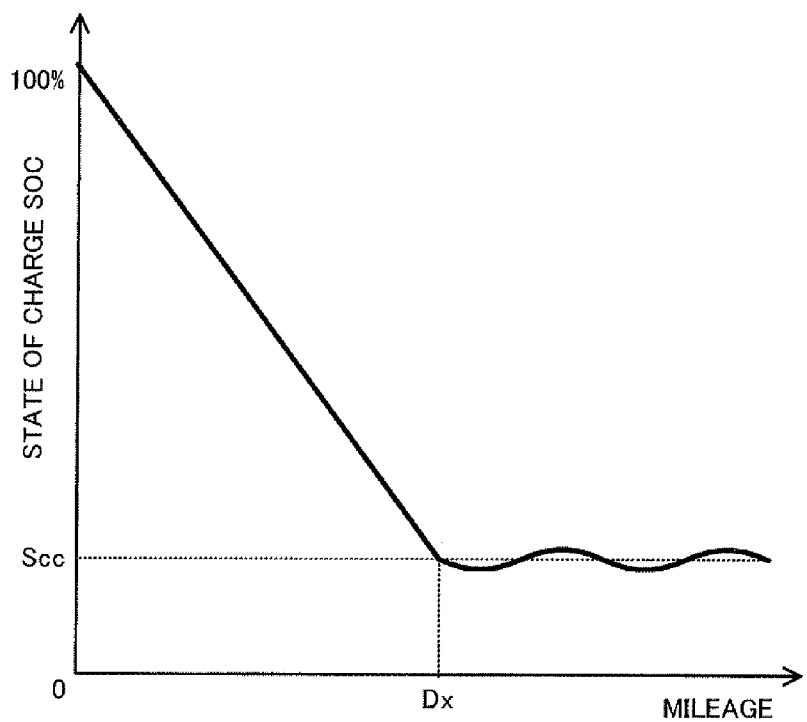
FIG. 7 is a view illustrating a change of a state of charge of a battery 50 after a start of a driving of the hybrid vehicle 20.

On the other hand, when determined that the flag F is value "0" while the engine 22 is operated at Step S260 and determined that the state of charge SOC is equal to or more than the control-center state of charge Scc at Step S270, the CPU 72 sets the target rotational speed Ne* or the target operation point of the engine 22 to an optimal efficiency rotational speed Nep that is a predetermined constant value and sets the target torque Te* to an optimal efficiency torque Tep that is a predetermined constant value (Step S310). In the embodiment, the optimal efficiency rotational speed Nep and the optimal efficiency torque Tep, that are set as the target operation point of the engine 22 at Step S310, are defined as a rotational speed and a torque that make the efficiency of the engine 22 optimal among the rotational speeds and the torques defined in the operation curve exemplified in FIG. 5. After setting the target rotational speed Ne* and the target torque Te* at Step S310, the CPU 72 executes above processes of Steps S300 and S180-S210 and repeats processes after Step S100. Thus, the engine 22 is operated so as to rotate at the target rotational speed Ne* and output the target torque Te* when the engine 22 is to be operated while the state of charge SOC of the battery 50 is equal to or more than the control-center state of charge Scc after the start of the driving of the hybrid vehicle 20. During that time, the engine 22 is efficiently operated so as to basically output constant power (Nep×Tep), and the more the torque demand Tr* increases, the ratio of torque from the motor MG2 to torque output to the ring gear shaft 32a or the axle increases. Further, the operation point of the engine 22 is kept constant when the engine 22 is to be operated while the state of charge SOC of the battery 50 is equal to or more than the control-center state of charge Scc after the start of the driving. This accelerates consumption of the electric power in the battery 50 by the motor as shown in FIG. 7 when the engine 22 is to be operated after the driving of the hybrid vehicle 20 is started in the adequately charged state of the battery 50 that is charged through the use of the charger 100. Furthermore, the engine 22 outputs the power demand P* based on the torque demand Tr* and the charge-discharge power demand Pb* after the state of charge SOC of the battery 50 once becomes less than the control-center state of charge Scc after the start of the driving. Accordingly, the battery 50 is charged by the electric power from the motor MG1 that generates electric power through the use of at least part of power from the engine 22, so that the state of charge SOC is kept with in the predetermined range including the control-center state of charge Scc.

When determined that the power demand P* is less than the engine stop determination threshold P0 at step S250 after determined that the engine 22 is operated at Step S120 and determined that the vehicle speed V is less than the intermittent prohibition vehicle speed Vref at Step S240, the CPU 72 sets a predetermined engine stop flag (Step S320) and terminates the routine. When the engine stop flag is set, the hybrid ECU 70 executes an engine stop drive control routine (not shown). The engine stop drive control routine stops a fuel supply to the engine 22 and sets the torque command Tm1* of the motor MG1 to a negative torque to decrease the rotational speed Ne of the engine 22 until the rotational speed Ne reaches a predetermined pre-stop rotational speed for example. The engine stop drive control routine sets the torque command Tm1* of the motor MG1 to a positive torque to hold a piston when the rotational speed Ne reaches the pre-stop rotational speed. Further, the engine stop drive control routine sets the torque command Tm2* so that torque equivalent to the torque demand Tr* is output to the ring gear shaft 32a. When the engine stop drive control routine is terminated, the engine stop flag is reset and the hybrid ECU 70 executes the drive control routine. The flag F that is set to value "1" at Step S220 or S280 is set to value "0" upon the stop of the driving of the hybrid vehicle 20.

As has been described above, the hybrid vehicle 20 of the embodiment includes the battery 50 that is capable of supplying and receiving electric power from the motor MG2 and is configured to be capable of being charged with electric power from the charger 100 outside of the vehicle 20. In the hybrid vehicle 20, the target rotational speed Ne* and the target torque Te* or the target operation point of the engine 22 are set to the optimal efficiency rotational speed Nep and the optimal efficiency torque Tep that enable the engine 22 to be operated efficiently when the engine 22 is to be operated while the state of charge SOC of the battery 50 is equal to or more than the control-center state of charge (reference state of charge) Scc after the start of the driving of the vehicle 20 (Step s310). Then, the engine 22 and the motors MG1 and MG2 are controlled so that the engine 22 is operated at the set target operation point and the torque equivalent to the torque demand Tr* is output to the ring gear shaft 32a or the axle (Step S300, S180-S210). When the engine 22 is to be operated after the state of charge SOC of the battery 50 once becomes less than the control-center state of charge Scc after the start of the driving of the vehicle, the target rotational speed Ne* and the target torque Te* or the target operation point of the engine 22 are set based on the torque demand Tr* (Step S290). Then, the engine 22 and the motors MG1 and MG2 are controlled so that the engine 22 is operated at the set target operation point and the torque equivalent to the torque demand Tr* is output to the ring gear shaft 32a or the axle (Step S300, S180-S210).

Thus, the engine 22 is efficiently operated at the above constant operation point (the optimal efficiency rotational speed Nep and the optimal efficiency torque Tep) so as to basically output the above constant power (Nep×Tep) when the engine 22 is to be operated while the state of charge SOC of the battery 50 is equal to or more than the predetermined control-center state of charge Scc after the start of the driving. During that time, the more the torque demand Tr* increases, the ratio of power from the motor MG2 to the torque output to the ring gear shaft 32a or the axle increases. Accordingly, the hybrid vehicle 20 improves a fuel efficiency of the engine 22 and accelerates consumption of the electric power in the battery 50 by the motor MG2 while the state of charge SOC of the battery 50 is equal to or more than the control-center state of charge Scc after the start of the driving. That is, because an efficiency of the power generation by the motor MG1 using power from the engine 22 is lower than that of commercial power (a power station), it is not preferable to use the power from the engine 22 so as to make the motor MG1 generate electric power for charging the battery 50 before the hybrid vehicle 20 adequately consumes electric power from the battery 50 that is charged by electric power from the charger 100 prior to the start of the driving. Accordingly, in the hybrid vehicle 20 of the embodiment, the control-center state of charge Scc is preset to a relatively small value and the operation point of the engine 22 is set to constant when the engine 22 is to be operated while the state of charge SOC of the battery 50 is equal to or more than the control-center state of charge Scc after the start of the driving so as to improve the fuel efficiency and to accelerate the consumption of the electric power in the battery 50 by the motor MG2. Further, the target operation point of the engine 22 is set based on the power demand P* according to the torque demand Tr* after the state of charge SOC of the battery 50 once becomes less than the control-center state of charge Scc after the start of the driving. Thus, adequate torque is output to the ring gear shaft 32 from the engine 22 and the torque based on the torque demand Tr* can be preferably output to the ring gear shaft 32a or the axle while supplying the electric power to the motor MG2 from the battery 50 within a restricted range of the state of charge range SOC to some extent, thereby facilitating to decrease the state of charge SOC of the battery 50 as much as possible upon a completion of the driving. Accordingly, in the hybrid vehicle 20 of the present invention including the battery 50 capable of being charged with electric power from the charger 100 outside of the vehicle 20, the engine 22 capable of outputting power for driving the vehicle 20 can be appropriately operated so as to improve the efficiency of the vehicle 20.

Further, in the hybrid vehicle 20 of the embodiment, the optimal efficiency rotational speed Nep and the optimal efficiency torque Tep, that are set as the target operation point of the engine 22 while the state of charge SOC of the battery 50 is equal to or more than the predetermined control-center state of charge Scc after the start of the driving, are defined as a rotational speed and a torque that make the efficiency of the engine 22 optimal among the rotational speeds and the torques defined in the operation curve exemplified in FIG. 5. That is, the operation point of the engine 22 is set to an operation point in which the efficiency of the engine 22 becomes practically optimal while the state of charge SOC of the battery 50 is equal to or more than the predetermined control-center state of charge Scc after the start of the driving. Thus, the engine 22 can be efficiently operated so as to improve the fuel efficiency of the engine 22 while the state of charge SOC of the battery 50 is equal to or more than the control-center state of charge Scc after the start of the driving. The "operation point in which the efficiency of the engine 22 becomes practically optimal" may be arbitrarily selected to the extent favorably ensuring the efficiency (fuel efficiency) of the engine 22 because the "practically optimal" is different between hybrid vehicles and engines.

In the hybrid vehicle 20 of the embodiment, after the state of charge SOC of the battery 50 once becomes less than the control-center state of charge Scc after the start of the driving of the vehicle, the target rotational speed Ne* and the target torque Te* that define the target operation point are set through the use of the power demand P* based on the torque demand Tr* and the charge-discharge power demand Pb* and the operation curve (operation point setting constraint) that defines rotational speeds and torques that correspond to the power demands and may enable the engine 22 to be operated efficiently (Step S290). Then, the engine 22 and the motors MG1 and MG2 are controlled so that the engine 22 is operated at the target operation point, the battery 50 is charged or discharged by the charge-discharge power demand Pb*, and the torque equivalent to the torque demand Tr* is output to the ring gear shaft 32a or the axle (Step S300, S180-S210). Thus, after the state of charge SOC of the battery 50 once becomes less than the control-center state of charge Scc after the start of the driving, the engine 22 can be relatively efficiently operated so as to improve the fuel efficiency of the engine 22 and the state of charge SOC of the battery 50 can be ensured within a range that facilitates to decrease the state of charge SOC of the battery 50 as much as possible upon the completion of the driving.

In the hybrid vehicle 20 of the embodiment, the engine start flag is set (Step S230) to start the engine 22 when the power demand P* becomes equal to or more than the engine start determination threshold P1 while the operation of the engine 22 is stopped. The engine start determination threshold P1 or a threshold used at Step S150 is preferably preset to a smaller value than the output power (Nep×Tep) of the engine 22 that is operated at the constant operation point defined by the optimal efficiency rotational speed Nep and the optimal efficiency torque Tep. Thus, the operation point of the engine 22 can be smoothly and quickly shifted to the constant operation point defined by the optimal efficiency rotational speed Nep and the optimal efficiency torque Tep after the power demand P* becomes equal to or more than the engine start determination threshold P1 and the engine 22 is started to operate.

Figure 8:
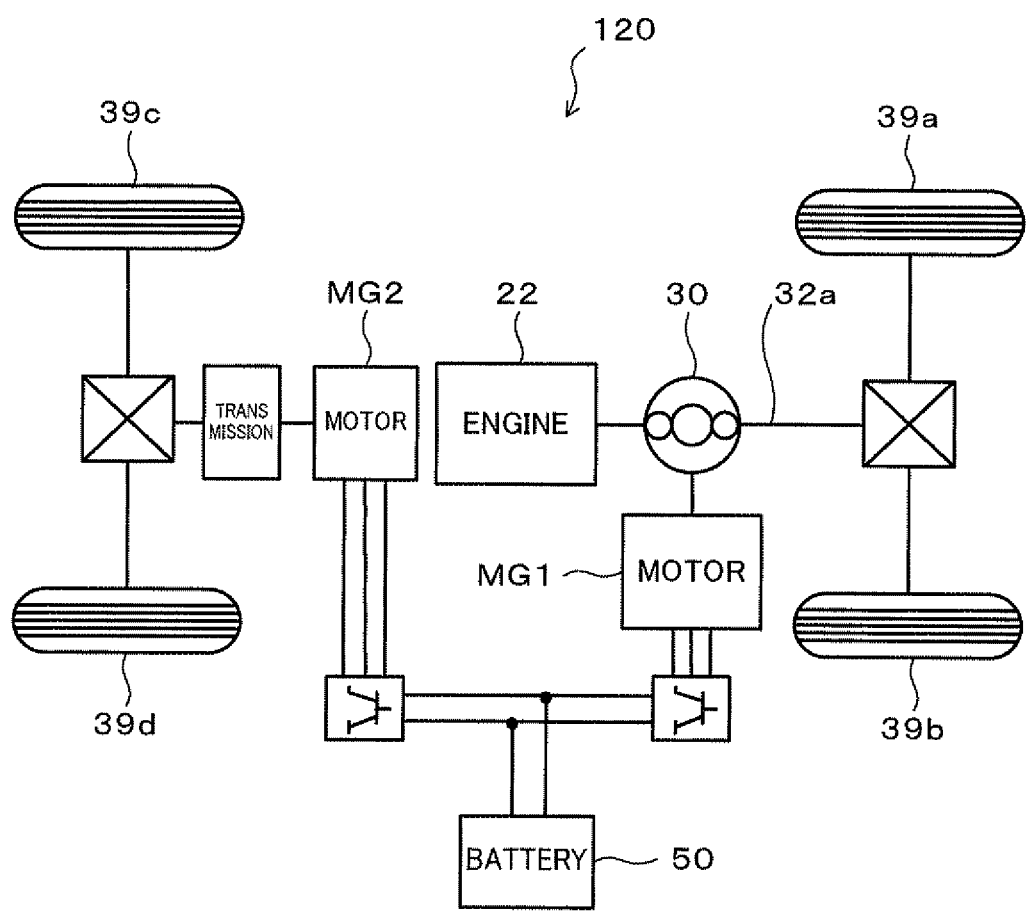
FIG. 8 is a schematic block diagram of a hybrid vehicle 120 according to a modification of the present invention.
Figure 9:
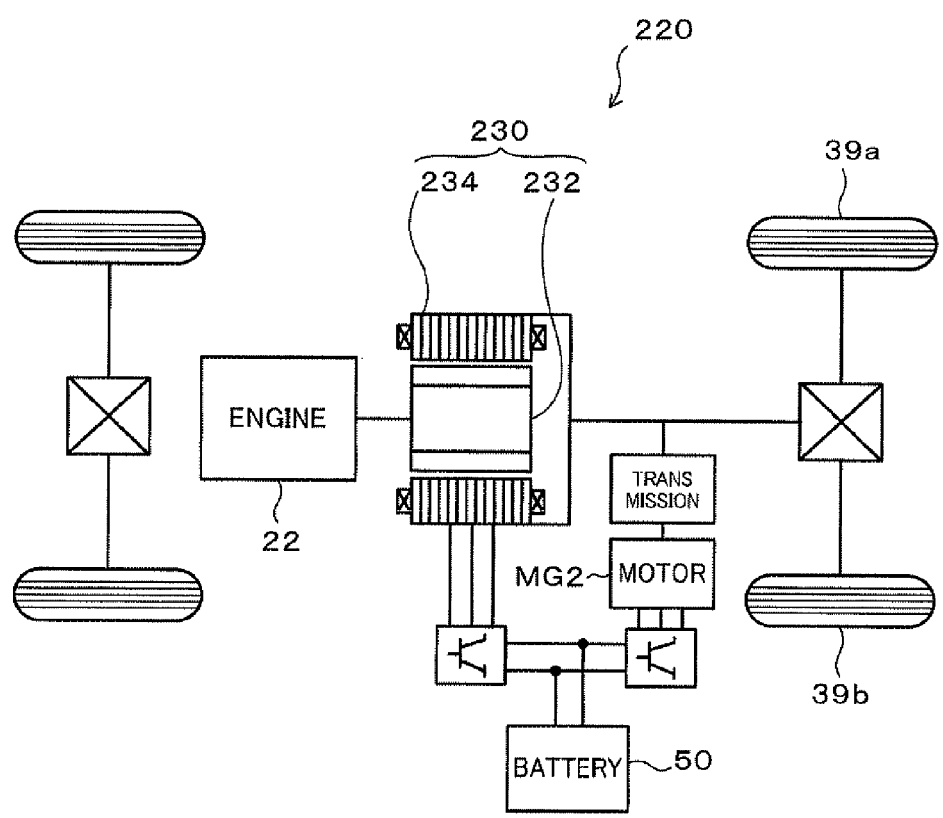
FIG. 9 is a schematic block diagram of a hybrid vehicle 220 according to a further modification of the present invention.
Figure 10:
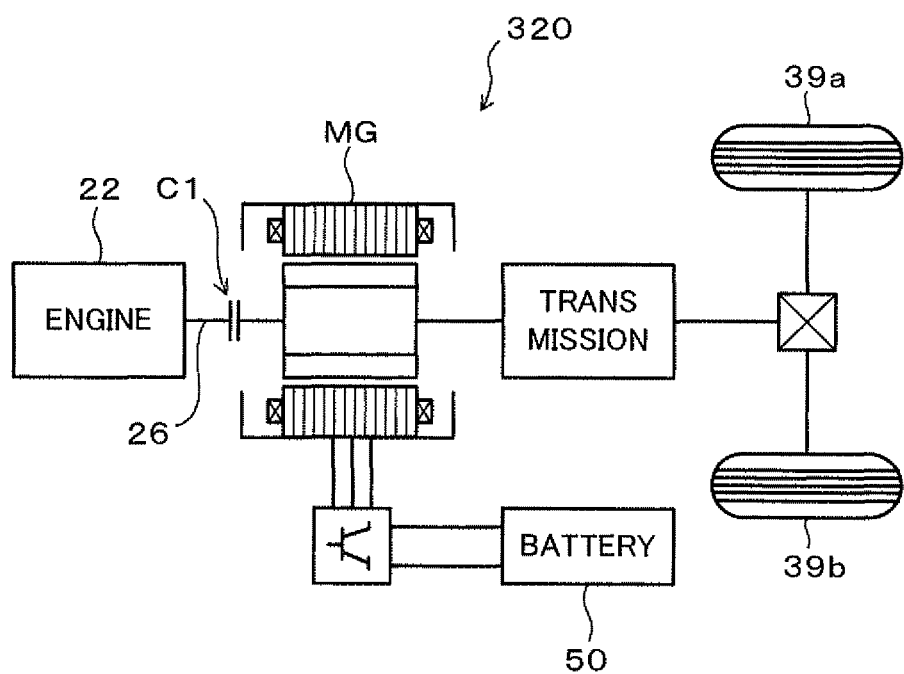
FIG. 10 is a schematic block diagram of a hybrid vehicle 320 according to a still further modification of the present invention.

In the hybrid vehicle 20 of the embodiment, the engine 22 may be operated at an operation point included within a predetermined range that enables the engine 22 to be operated efficiently instead of the above constant operation (the optimal efficiency rotational speed Nep and the optimal efficiency torque Tep) when the engine 22 is to be operated while the state of charge SOC of the battery 50 is equal to or more than the control-center state of charge Scc after the start of the driving. That is, the operation point of the engine 22 may be changed to the extent favorably ensuring the efficiency while the state of charge SOC of the battery 50 is equal to or more than the control-center state of charge Scc after the start of the driving. In the hybrid vehicle 20 of the embodiment, the ring gear shaft 32a is connected to the motor MG2 via the reduction gear 35 that reduces the rotational speed of the motor MG2 and transmits the reduced rotation speed to the ring gear shaft 32a. The reduction gear 35 may be replaced with a transmission that has two different speeds Hi and Lo or three or a greater number of different speeds and is designed to change the rotation speed of the motor MG2 and transmits the changed rotational speed to the ring gear shaft 32a. In the hybrid vehicle 20 of the embodiment, the power of the motor MG2 is subjected to speed reduction by the reduction gear 35 and is output to the ring gear shaft 32a. The technique of the invention is, however, not limited to the hybrid vehicle of this configuration but is also applicable to a hybrid vehicle 120 of a modified configuration shown in FIG. 8. In the hybrid vehicle 120 of FIG. 8, the power of the motor MG2 is output to another axle (an axle connected to wheels 39c and 39d) that is different from the axle connecting to the ring gear shaft 32a (the axle connected to the drive wheels 39a and 39b). The scope of the invention is not limited to the hybrid vehicle 20 of the embodiment that outputs the power from the engine 22 to the ring gear shaft 32a or the axle connected to the wheels 39a and 39b or the drive wheels through the power distribution and integration mechanism 30. As in the case of a hybrid vehicle 220 as a modification example shown in FIG. 9, the present invention may also be applied to a hybrid vehicle that includes a pair-rotor motor 230 that has an inner rotor 232 connected to the crankshaft of the engine 22, and an outer rotor 234 connected to the axle that outputs the power to the wheels 39a and 39b and that transmits a part of the power output from the engine 22 to the axle while converting the remainder of the power into electric power. Further, the present invention may also be applied to a hybrid vehicle 320 a modification example shown in FIG. 10. In the hybrid vehicle 320 shown in FIG. 10, the crankshaft 26 of the engine 22 is connected to the motor MG (rotor) or the synchronous motor generators via a clutch C1 and the motor MG (rotor) is connected to the an input shaft of an automatic transmission such as a continuously variable transmission (CVT). The power from the input shaft of the automatic transmission is transmitted from the input shaft through a differential gear and the like and is eventually output to drive wheels 39a and 39b.

The correlation between the principal elements of the embodiment and modification examples, and the principal elements of the invention described in the "Disclosure of the Invention" section will now be described. That is, in the above described embodiment and modification examples, the engine 22 capable of outputting power to the ring gear shaft 32a corresponds to "internal combustion engine", the motor MG2 capable of outputting power to the ring gear shaft 32a corresponds to the "motor", the battery 50 capable of supplying and receiving electric power from the motor MG1 and MG2 and configured to be capable of being charged with electric power from the charger 100 outside of the vehicle 20 corresponds to "accumulator", the hybrid ECU 70 executing the process of Step S110 in FIG. 3 corresponds to "driving force demand setting module", the hybrid ECU 70 executing the processes of Steps S120, S240-S290, S310 in FIG. 3 corresponds to "engine operation point setting module", a combination of the hybrid ECU 70 executing the drive control routine shown in FIG. 3, the engine ECU 24 and the motor ECU 40 corresponds to "control module". Further, the battery ECU 52 that sets the charge-discharge power demand Pb* using the charge-discharge power demand setting map shown in FIG. 2 corresponds to "target charge-discharge electric power setting module", the motor MG1 and the pair-rotor motor 230 corresponds to "generator" and "power generation motor", a combination of the motor MG1 and the power distribution and integration mechanism 30, and the pair-rotor motor 230 correspond to "electric power-mechanical power input output structure", the power distribution and integration mechanism 30 corresponds to "three shaft-type power input output structure".

The "internal combustion engine" is not limited to the engine 22 that consumes a hydrocarbon fuel, such as gasoline or light oil and outputs power, but may be an internal combustion engine of any other design, for example, a hydrogen engine. The "motor" and "power generation motor" are not limited to the motor MG2 and the motor MG1 constructed as the synchronous motor generator but may have any other configuration or design, for example, an induction motor. The "driving force demand setting module" is not limited to the configuration of setting the torque demand or the driving force demand based on the accelerator opening and the vehicle speed but may be any other suitable configuration of, for example, setting the driving force demand based on only the accelerator opening. The "engine operation point setting module" may be any configuration of setting the target operation point of the internal combustion engine to the predetermined operation point that enables the internal combustion engine to be operated efficiently when the internal combustion engine is to be operated while the residual capacity of the accumulator is equal to or more than a predetermined reference residual capacity after the start of the driving of the vehicle, and setting the target operation point of the internal combustion engine based on the set driving force demand when the internal combustion engine is to be operated after the residual capacity of the accumulator once becomes less than the reference residual capacity after the start of the driving of the vehicle. The "control module" is not limited to the combination of the hybrid ECU 70, the engine ECU 24 and the motor ECU 40 but may be implemented by a single electronic control unit, for example. In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

INDUSTRIAL APPLICABILITY

The present invention can be used in a manufacturing industry or the like of the hybrid vehicle.

The invention claimed is:

1. A hybrid vehicle that includes an internal combustion engine and a motor that are respectively capable of outputting power for driving the vehicle, the hybrid vehicle comprising:
    an accumulator that is capable of supplying and receiving electric power from the motor, the accumulator configured to be capable of being charged with electric power from a charge source outside of the vehicle;
    a driving force demand setting module configured to set a driving force demand required for driving the vehicle;
    an engine operation point setting module that sets a target operation point of the internal combustion engine to a predetermined constant operation point that enables the internal combustion engine to be operated efficiently when the internal combustion engine is to be operated while a residual capacity of the accumulator is equal to or more than a predetermined reference residual capacity after a start of a driving of the vehicle, the predetermined constant operation point defined by a predetermined constant rotation speed value not being 0 and a predetermined constant torque value not being 0, the engine operation point setting module setting the target operation point of the internal combustion engine based on the set driving force demand when the internal combustion engine is to be operated after the residual capacity of the accumulator becomes less than the reference residual capacity after the start of the driving of the vehicle; and
    a control module configured to control the internal combustion engine and the motor so that the internal combustion engine is operated at the set target operation point and a driving power equivalent to the set driving force demand is ensured.

2. The hybrid vehicle according to claim 1, wherein the predetermined constant operation point is an operation point in which an efficiency of the internal combustion engine becomes optimal.

3. The hybrid vehicle according to claim 1, further comprising:
    a generator that is capable of generating electric power through the use of at least part of power from the internal combustion engine and supplying and receiving electric power from the accumulator; and
    a target charge-discharge electric power setting module that sets a target charge-discharge electric power to charge or discharge the accumulator so as to keep the residual capacity of the accumulator within a predetermined range including the reference residual capacity, wherein the engine operation point setting module sets a target rotational speed and a target torque that define the target operation point of the internal combustion engine through the use of a power demand based on the set driving force demand and the set target charge-discharge electric power and an engine operation point setting constraint after the residual capacity of the accumulator becomes less than the reference residual capacity after the start of the driving of the vehicle, the engine operation point setting constraint defining rotational speeds and torques that correspond to the power demands and enable the internal combustion engine to be operated efficiently, wherein the control module controls the internal combustion engine, the generator and the motor so that the internal combustion engine is operated at the set target operation point, the accumulator is charged or discharged by the set target charge-discharge electric power, and the driving power equivalent to the set driving force demand is ensured, and wherein the predetermined constant operation point defined by the predetermined constant rotational speed value and the predetermined torque value make an efficiency of the internal combustion engine optimal among the rotational speeds and the torques defined in the engine operation point setting constraint.

4. The hybrid vehicle according to claim 1, wherein a stop of an operation of the internal combustion engine is prohibited when a power demand based on at least the set driving force demand becomes equal to or more than a predetermined threshold while the operation of the internal combustion engine is stopped, the predetermined threshold being smaller than a power output by the internal combustion engine operated at the predetermined operation point.

5. The hybrid vehicle according to claim 1, further comprising:
    an electric power-mechanical power input output structure connected to a predetermined axle and an engine shaft of the internal combustion engine and outputting at least a part of power from the internal combustion engine to the axle side with input/output of electric power and mechanical power, the electric power-mechanical power input output structure supplying and receiving electric power from the accumulator.

6. The hybrid vehicle according to claim 5, wherein the electric power-mechanical power input output structure includes a power generation motor capable of inputting and outputting power and supplying and receiving electric power from the accumulator, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts, and wherein the motor is capable of inputting and outputting power to the predetermined axle or another axle different from the predetermined axle.

* * * * *